United States Patent [19]
Kobayashi et al.

[11] Patent Number: 6,142,016
[45] Date of Patent: Nov. 7, 2000

[54] APPARATUS FOR DETECTING RESIDUAL QUANTITY OF TONERS

[75] Inventors: Kouji Kobayashi, Kawasaki; Shinji Sato, Inagi; Takeo Kojima, Kawasaki; Nobuyuki Tanaka, Kawasaki; Michio Shimura, Kawasaki, all of Japan

[73] Assignee: Fujitsu Limited, Kawasaki, Japan

[21] Appl. No.: 08/338,194

[22] Filed: Nov. 9, 1994

[30]  Foreign Application Priority Data

Dec. 28, 1993 [JP] Japan ................................. 5-349715

[51] Int. Cl.⁷ ............................ G01F 23/00; G03G 21/00
[52] U.S. Cl. ............................................. 73/295; 355/206
[58] Field of Search ............................... 73/295; 324/706, 324/721, 725; 374/54, 183; 340/617, 622; 399/27; 355/203, 206

[56]  References Cited

U.S. PATENT DOCUMENTS

| | | | |
|---|---|---|---|
| 3,500,687 | 3/1970 | Smith | 73/295 |
| 3,577,074 | 5/1971 | Praglin | 324/706 |
| 3,955,416 | 5/1976 | Waiwood | 73/295 |
| 4,053,874 | 10/1977 | Glasser | 73/295 |
| 4,319,233 | 3/1982 | Matsuoka et al. | 340/622 |
| 4,404,809 | 9/1983 | Johnson et al. | 62/49 |
| 4,564,834 | 1/1986 | Steele | 340/622 |
| 4,609,913 | 9/1986 | Arbogast et al. | 340/622 |
| 4,658,120 | 4/1987 | Fujikawa | 219/505 |
| 4,992,724 | 2/1991 | Hisanaga et al. | 323/367 |
| 5,105,219 | 4/1992 | Yoshikado | 399/27 |
| 5,162,848 | 11/1992 | Saitoh et al. | 399/27 |
| 5,174,153 | 12/1992 | Nakano | 73/295 |
| 5,201,223 | 4/1993 | McQueen | 73/295 |
| 5,216,462 | 6/1993 | Nakajima et al. | 355/203 |

FOREIGN PATENT DOCUMENTS

| | | | |
|---|---|---|---|
| 59-104515 | 6/1984 | Japan | 73/295 |
| 60-66146 | 4/1985 | Japan | 324/721 |
| 63-42423 | 2/1988 | Japan | 73/295 |
| 3-28721 | 2/1991 | Japan | 73/295 |

*Primary Examiner*—Harshad Patel
*Attorney, Agent, or Firm*—Armstrong, Westerman, Hattori, McLeland & Naughton

[57]  ABSTRACT

Disclosed is a toner residual quantity detecting apparatus for detecting a residual quantity of toners in a developing unit. This toner residual quantity detecting apparatus has a temperature sensor, provided in the bottom of the developing unit, for generating an output proportional to a detected temperature and a detecting circuit for detecting the toner residual quantity from the output of the temperature sensor. This temperature sensor detects a difference between temperatures when covered with the toners and when not covered with the toners, thereby detecting the toner residual quantity.

21 Claims, 4 Drawing Sheets

APPARATUS FOR DETECTING RESIDUAL QUANTITY OF TONERS

BACKGROUND OF THE INVENTION

1. Field of the Invention

The present invention relates to a toner residual quantity detecting apparatus for detecting a toner empty, i.e., a residual quantity of toners in a developing unit.

2. Description of the Related Art

In an image forming apparatus such as a printer apparatus or the like, toners are supplied to an electrostatic latent image on a photosensitive drum, thus performing a development. The toners are housed in the developing unit and then supplied to the photosensitive drum, This developing unit is classified into a 2-component developing unit using carriers and the toners, a 1.5-component developing unit using magnetic toners and a 1-component developing unit using non-magnetic toners.

In any developing unit, the toners are consumed with the developing operation. It is therefore required that a residual quantity of the toners in the developing unit be detected and the user be informed of a toner replenishment timing.

In a conventional apparatus employing the magnetic toners for detecting the toner residual quantity, a sensitive-to-magnetism sensor for detecting a magnitude of a magnetic force of the toners is employed. Further, in the apparatus employing the non-magnetic toners, there is used a transmitting type sensor for optically detecting the toners.

The sensitive-to-magnetism sensor is, however, large in size and unsuitable for a small-sized apparatus. The sensitive-to-magnetism sensor is also expensive. Furthermore, the sensitive-to-magnetism sensor is incapable of detection unless the magnetic toners are employed.

On the other hand, the transmitting type sensor is easy to make a mis-detection due to contaminations on a sensor case.

SUMMARY OF THE INVENTION

It is a primary object of the present invention to provide a small-sized toner residual quantity detecting apparatus.

It is another object of the present invention to provide a toner residual quantity detecting apparatus capable of reducing mis-detections.

It is still another object of the present invention to provide a toner residual quantity detecting apparatus capable of being manufactured at low costs.

To accomplish the above objects, according to one aspect of the invention, there is provided a toner residual quantity detecting apparatus for detecting a toner residual quantity in a developing unit for housing toners, comprising: a temperature detecting element, provided in the bottom of the developing unit, for generating an output proportional to a detected temperature; and a detecting circuit for detecting the toner residual quantity from the output of the temperature detecting element.

According to the present invention, the temperature detecting element is provided in the bottom of the developing unit. There is produced a difference between the detected temperatures of the temperature detecting element when the temperature detecting element in this developing unit is covered with the toners and when not covered therewith. The detecting circuit detects this difference, thereby detecting the toner residual quantity.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
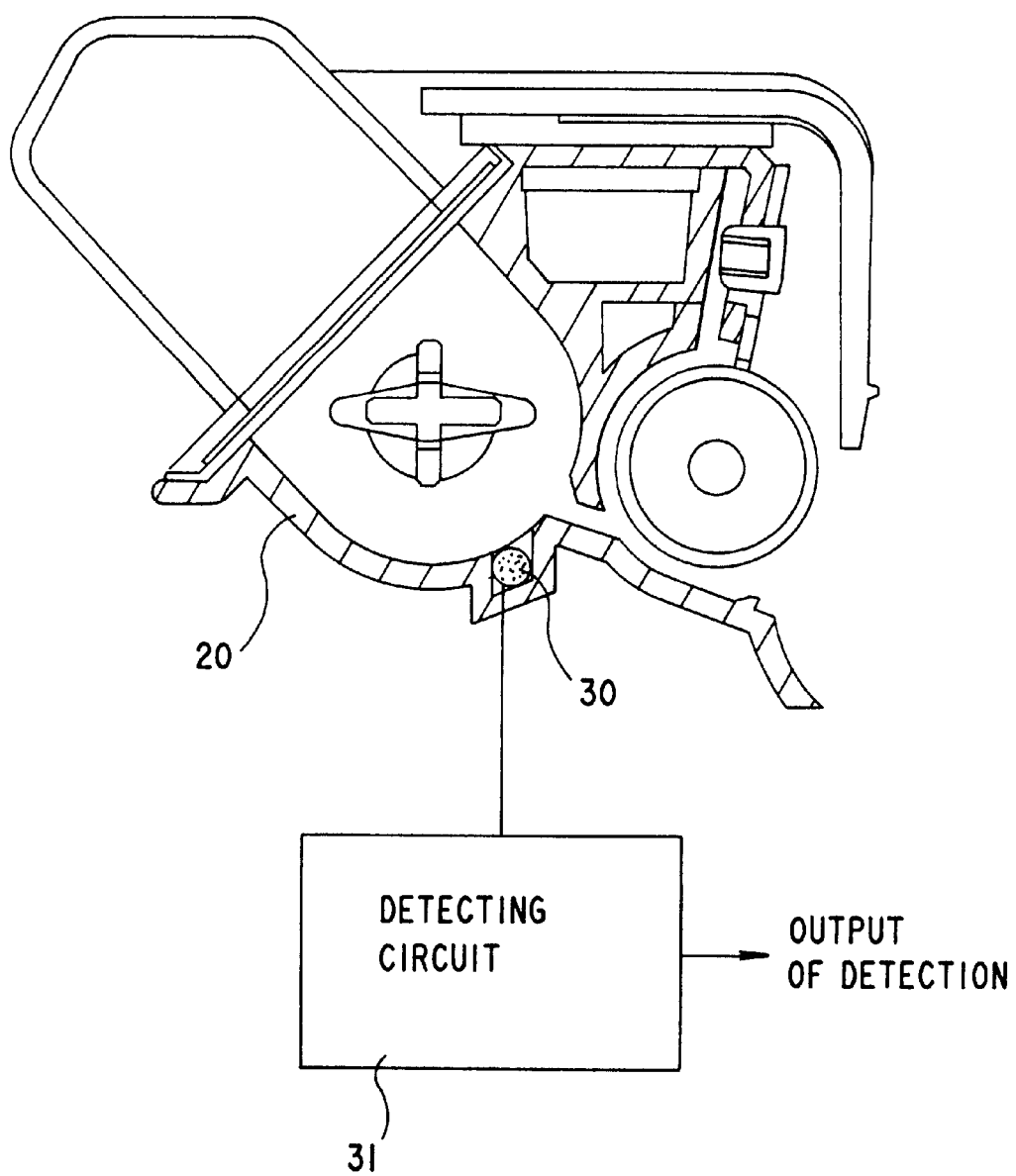
FIG. 1 is a view showing the principle of the present invention.

FIG. 1 is a view showing the principle of the present invention.

As illustrated in FIG. 1, a temperature detecting element 30 is provided on the bottom of a developing unit 20. This temperature detecting element 30 detects an internal temperature of the developing unit 20 and generates an output corresponding to the detected temperature. The temperature detecting element 30 is constructed of, e.g., a thermistor or the like. In this temperature sensor 30, there is produced a difference between the detected temperatures when covered with toners and when not covered with the toners. A detecting circuit 31 determines this detected temperature difference from an output of the temperature detecting element 30. An existence or non-existence of the toners can be thereby detected.

Figure 2:
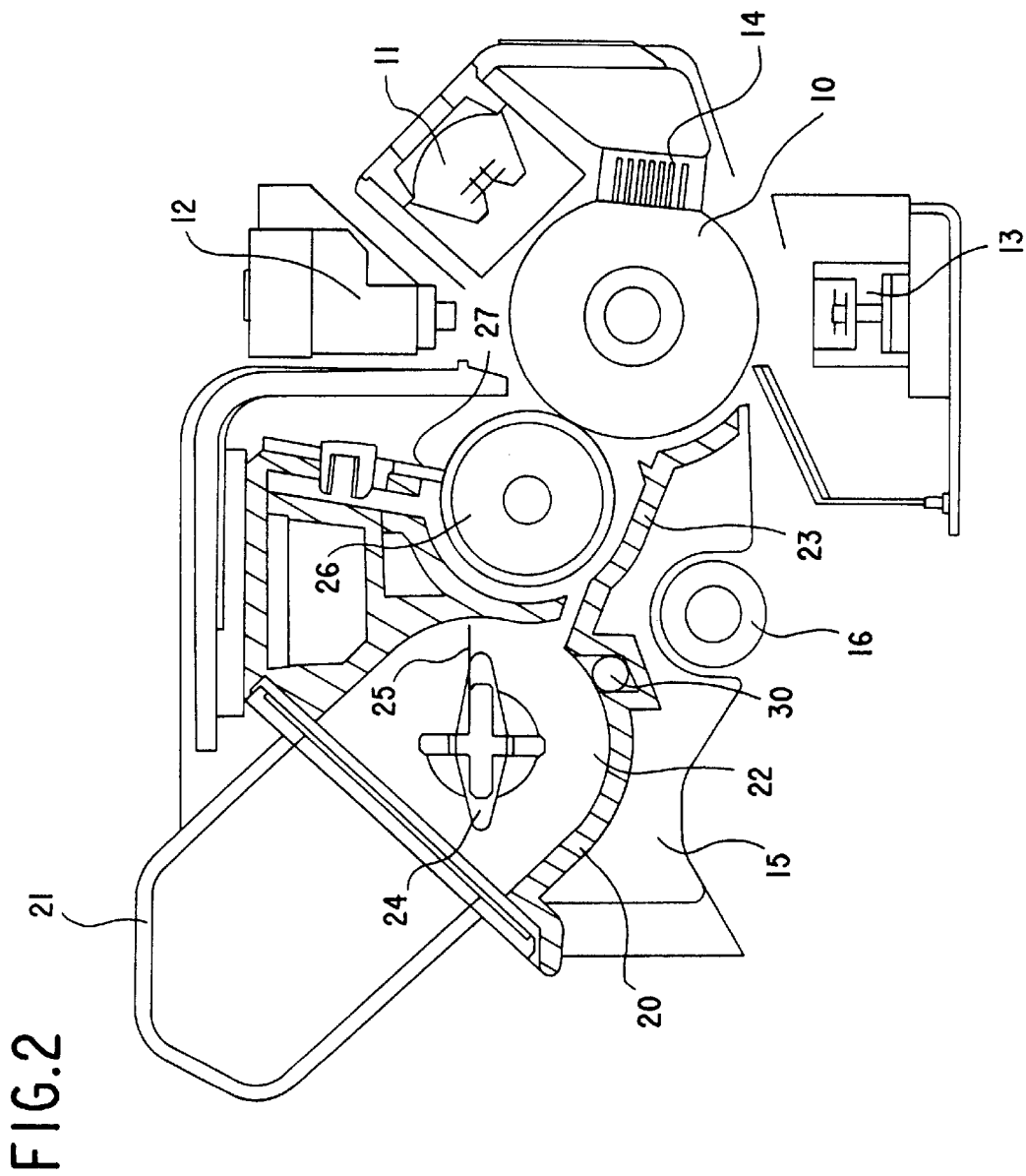
FIG. 2 is a view illustrating a construction of one embodiment of the present invention.
Figure 3:
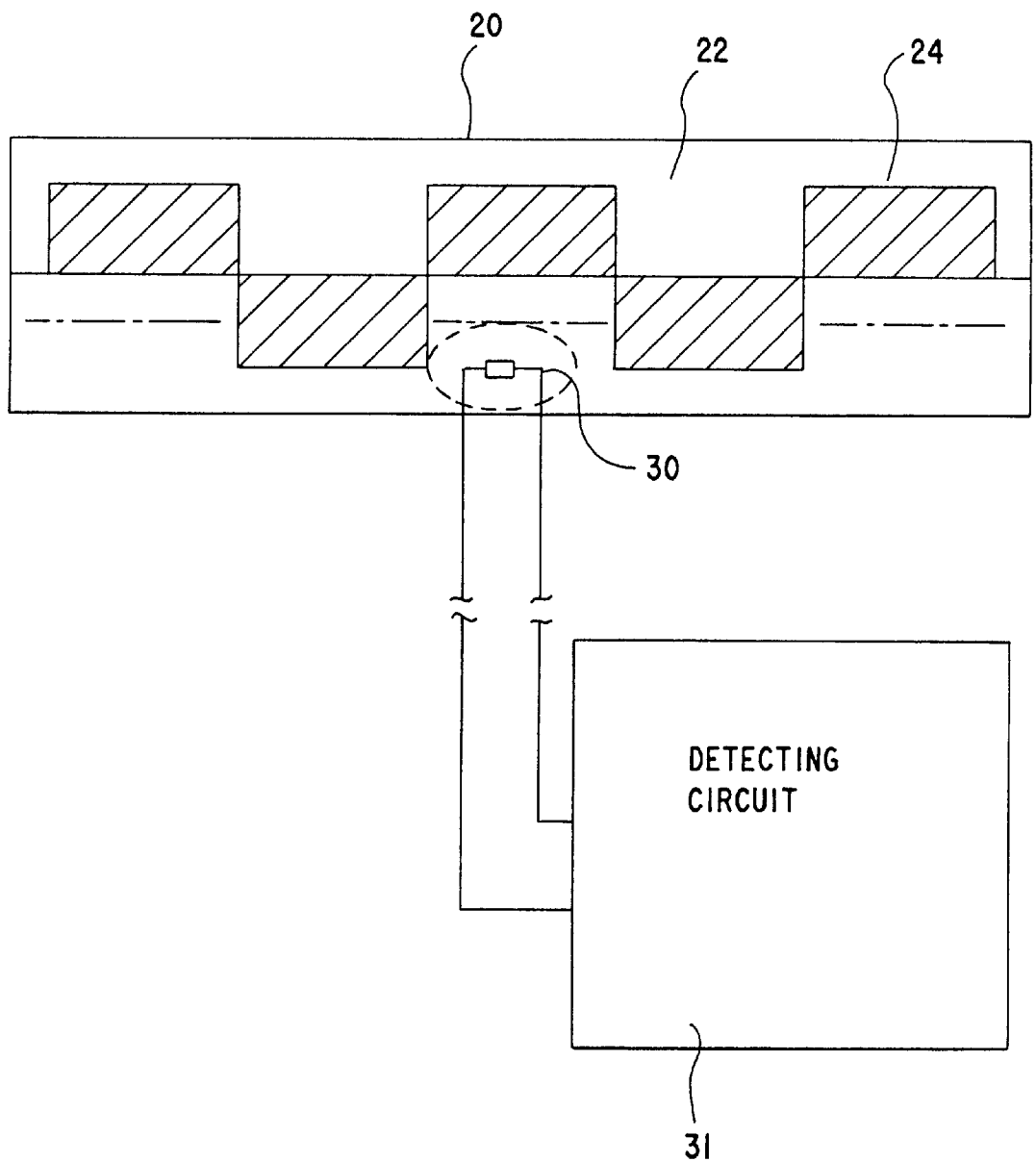
FIG. 3 is an explanatory diagram showing a position for attaching a temperature sensor.
Figure 4:
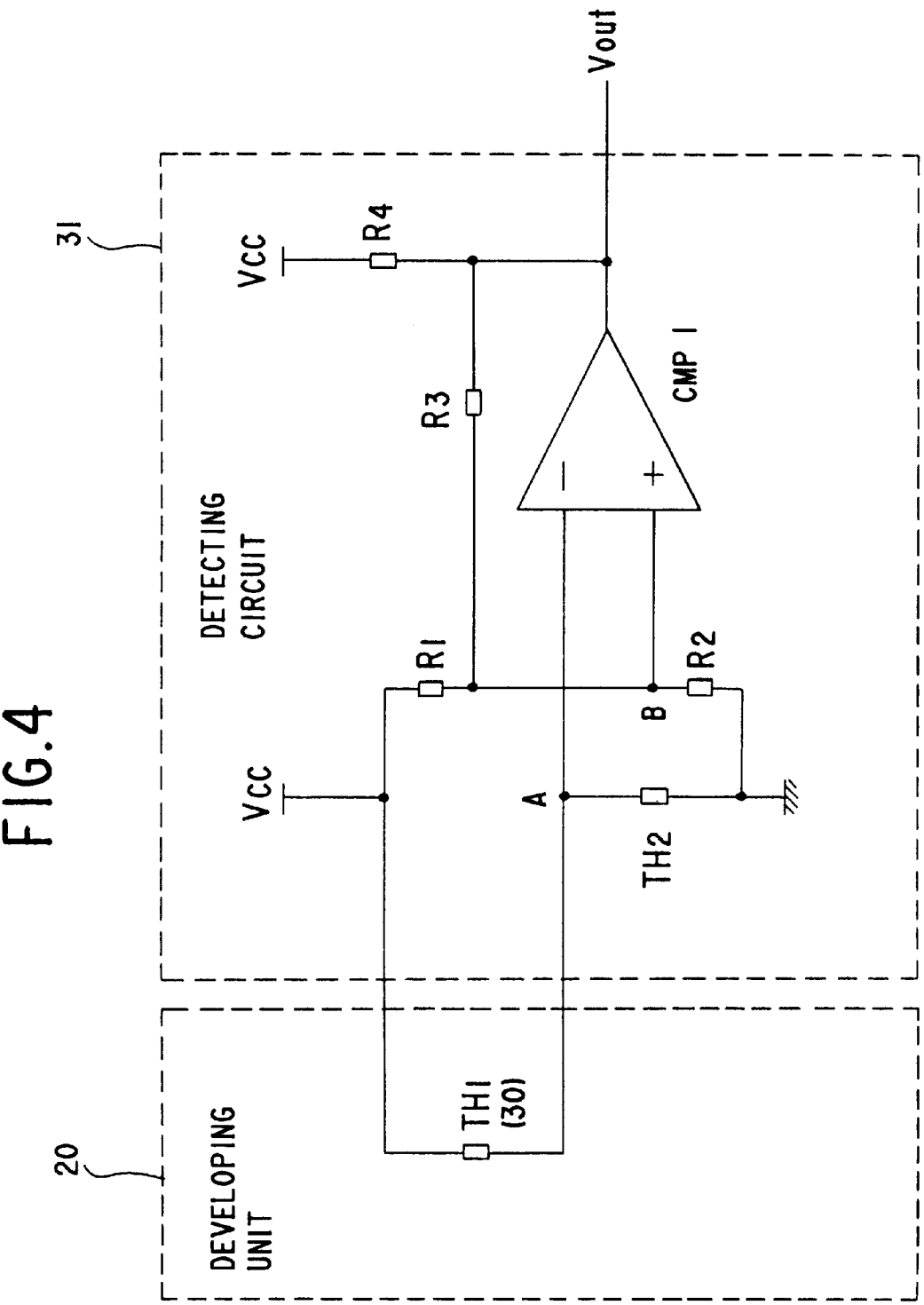
FIG. 4 is a circuit diagram of a detecting circuit of FIG. 3.

FIG. 2 is a view illustrating a construction of one embodiment of the present invention. FIG. 3 is an explanatory diagram showing an attaching position of the sensor of FIG. 2. FIG. 4 is a circuit diagram illustrating the detecting circuit of FIG. 3.

As illustrated in FIG. 2, a photosensitive drum 10 is uniformly charged by a pre-charger 11, and, thereafter, an image thereon is exposed by use of an LED optical system 12. An electrostatic latent image is thereby formed on the photosensitive drum 10. The developing unit 20 supplies the photosensitive drum 10 with the toners. Thus, the electrostatic latent image on the photosensitive drum 10 is developed by the supplied toners.

A toner image on the photosensitive drum 10 is transferred by a transferring unit 13 onto a sheet fed by feed rollers 16 and guided by a sheet guide 15. On the other hand, residual toners on the photosensitive drum 10 are cleaned by a cleaner 14.

In the developing unit 20, a toner hopper 21 houses the magnetic toners. The magnetic toners in this toner hopper 21 drop down into an agitating chamber 22. The agitating chamber 22 incorporates an agitator 24 provided with an agitating film 25. The magnetic toners in the agitating chamber 22 are agitated by rotations of the agitator 24. The magnetic toners are thereby charged and fed into a developing chamber 23.

The developing chamber 23 incorporates a magnet roll 26 for feeding the magnetic toners and a doctor blade 27 for regulating a toner layer thickness of the magnet roll 26. Accordingly, a layer thickness of the magnetic toners is regulated by the doctor blade 27. Then, the magnetic toners are fed by the magnet roll 26 to the photosensitive drum 10. Thus, a developing operation is performed.

The thermistor (temperature detection sensor) 30 is provided in a position (the bottom of the agitating chamber 22) enough to contact the toners. This agitating chamber 22 is full of the magnetic toners. With this developing operation, the magnetic toners are gradually consumed. Hence, with this consumption of the magnetic toners, the full-of-toner state changes to a non-contact-with-toner state along the periphery of the thermistor 30. When not in contact with the toners, the thermistor 30 comes to contact the air, and a thermal resistance of the thermistor 30 varies. The existence or non-existence (toner empty) of the toners can be thereby detected.

As discussed above, in the heating type temperature detecting element such as the thermistor, the detected temperature decreases when the toners remain. Whereas if no toner remains, the detected temperature increases due to a heat radiation. The detected temperature differs depending on this toner quantity, and, therefore, a toner residual quantity can be detected from a difference between the detected temperatures.

Further, the temperature detecting element involves the use of the heating type thermistor in which the resistance value changes corresponding to the detected temperature. For this reason, the toner residual quantity detecting apparatus can be manufactured at low costs.

As shown in FIG. 3, this thermistor 30 is provided in the central position of the bottom of the agitating chamber 22. Then, this thermistor 30 is also disposed under the agitator 24. The detecting circuit 31 is electrically connected to this thermistor 30.

The detecting circuit 31 will be explained with reference to FIG. 4. Referring to FIG. 4, a toner detection thermistor TH1 (30) is provided in the developing unit 20. The detecting circuit 31 is provided with a temperature compensation thermistor (second temperature detecting element) TH2 connected in series to the thermistor TH1. The thermistors TH1, TH2 for use are those of the same type. Accordingly, the thermal resistance characteristics of the thermistors TH1, TH2 are the same.

Resistors R1, R2 generate a reference voltage for detecting a variation in ratio between the resistance values of the thermistors TH1, TH2. A comparator CMP1 compares a magnitude of a voltage at a point A (connecting point between the thermistors TH1 and TH2) with a magnitude of the reference voltage at a point B (connecting point between the resistors R1 an R2).

A resistor R3 gives a hysteresis characteristic to an output of the comparator CMP1. A fluctuation in the output is thereby restrained. A resistor R4 serves to pull up the output because of the output of the comparator CMP1 being of an open collector type.

This operation will be explained. The specifications of the thermistors TH1, TH2 and a value of a power supply voltage Vcc are determined so that the self-exothermic state of each of the thermistors TH1, TH2 is caused by electric currents flowing across the thermistors TH1, TH2. The thermistors TH1, TH2 are connected in series, and, hence, the electric currents flowing across the individual thermistors are equal. Accordingly, if ambient environments (temperatures) of the thermistors TH1, TH2 are the same, the heat is similarly emitted. Then, the resistance values when emitting the heat are also equal to each other. For this reason, if the ambient environments are equal, the voltage at the point A decreases down to ½ of the power supply voltage.

The thermistor exhibits such a nature that the resistance value increases with a lower ambient temperature but decreases with a higher ambient temperature. Hence, when the developing unit 20 is filled with the toners, and when the thermistor TH1 is covered with the toners, the heat of the thermistor TH1 is absorbed by the toners existing along the periphery thereof. Therefore, the temperature of the thermistor TH1 decreases, while its resistance value increases. Accordingly, the ratio between the resistance values of the thermistors TH1, TH2 changes, and the voltage at the point A drops down. The comparator CMP1 detects the drop in the voltage at the point A in this toner-remaining-state and outputs it as a toner-remaining-output Vout.

Reversely, when the developing unit 20 is short of the toners, and when the thermistor TH1 is not covered with the toners, the heat of the thermistor TH1 is not absorbed by the ambient toners. Consequently, the temperature of the thermistor TH1 increases, and the resistance value thereof is reduced. Accordingly, the ratio between the resistance values of the thermistors TH1 and TH2 varies, and the voltage at the point A rises. The comparator CMP1 detects the rise in the voltage at the point A in this tonerless-state and outputs it as a tonerless-output Vout.

Even when an apparatus-placed temperature changes, the resistance values of the thermistors TH1, TH2 vary at the same rate, and, therefore, the point-A voltage does not undergo an influence of the ambient temperature but changes depending on only the existence or non-existence of the toners.

In this manner, the temperature detector for generating the output corresponding to the detected value is used for detecting the residual quantity of the toners, and hence down-sizing of the toner residual quantity sensor can be attained. For example, the present apparatus can be easily mounted in even a small-sized apparatus such as a printer apparatus installed on the desk. Further, the temperature detector is inexpensive, and the apparatus can be therefore manufactured at the low costs. Moreover, a mis-detection due to contaminations as seen in the optical sensor can be also prevented.

Also, the heating type temperature sensor is employed, and it is therefore possible to detect the toner residual quantity by skillfully making use of the phenomenon in which the heat is absorbed by the toners. Further, the thermistor is used as the temperature detecting element, and, hence, the apparatus can be manufactured at the low costs. The stable operation is also performable.

Besides, the temperature detecting element is provided in the detecting circuit 31 wherein the toners do not exist along its periphery all the times. The toner residual quantity can be therefore detected from the difference between the detected temperatures. For this reason, it is feasible to detect the toner residual quantity without undergoing the influence by the variations in the ambient temperature. In addition, these two temperature detecting elements have the identical characteristics, and, therefore, the toner residual quantity is detectable without being influenced by the variations in the embodiment temperature.

The present invention may take the following modifications other than the embodiments discussed above.

First, in the above-discussed embodiments, the second temperature detecting element is disposed in the position wherein the toners do not exist along the periphery thereof all the time. Reversely, the second temperature detecting element may be provided in such a position that the toners always exist along the periphery. Even in such an arrangement, the second temperature detecting element for detecting the reference temperature is provided, and the accurate toner residual quantity is therefore detectable.

Second, there may be taken such a configuration that a heating element is provided in the developing unit, and the temperature detecting element 30 detects the heat transferred via the toners from the heating body. In this case, the temperature detecting element may be the heating type or a non-heating type. As described above, the toner empty can be also detected from a magnitude of the thermal conduction from the heating body to the temperature detecting element in the developing unit.

Third, this heating body can be also constructed to emit the heat periodically. This makes it possible to actualize a reduction in the electric power without giving the extra heat to the toners.

Fourth, the temperature detecting element is not limited to the thermistor but may involve the use of other sensors for generating an output corresponding to a detected temperature. Fifth, a point-A voltage may be directly outputted by utilizing an AD converter in place of the comparator CMP1 of the detecting circuit. Sixth, the toners have been explained in the form of the magnetic toners, but non-magnetic toners are also available. Seventh, the present invention has been explained in the form of the printer apparatus in the embodiments discussed above but may be applied to other image forming apparatuses such as a copying machine, a facsimile, etc.

The present invention has been discussed so far by way of the embodiments. However, a variety of modifications can be carried out within the scope of the gist of the present invention but not excluded from the scope of the present invention.

As discussed above, according to the present invention, the detecting circuit 30 detects the difference between the detected temperatures when covered with the toners and when not covered with the toners. The toner residual quantity is thus detected, and, therefore, the down-sizing of the toner residual quantity sensor is attainable. The small-sized apparatus is capable of detecting the toner residual quantity. Further, the temperature detecting element is inexpensive and can be therefore actualized at the low costs. Moreover, as in the case of the optical sensor, because of undergoing no influence by the contaminations, the toner residual quantity can be stably detected.

What is claimed is:

1. A developing apparatus for developing a latent image on a latent image carrier, comprising:
   a supplying means for supplying toners to said latent image carrier;
   a toner residual quantity detecting means for detecting a toner residual quantity in said developing apparatus for housing toners, wherein said toner residual quantity detecting means comprises:
      a first temperature detecting means, provided in a bottom portion of said developing apparatus, for generating an output proportional to a detected temperature; and
      a detecting circuit means for detecting sad toner residual quantity from said output of said first temperature detecting means.

2. The developing apparatus according to claim 1, wherein said first temperature detecting means is a heating type temperature detector.

3. The developing apparatus according to claim 2, wherein said first temperature detecting means is a thermistor.

4. The developing apparatus according to claim 3, wherein said detecting circuit means includes a second temperature detecting means for making a comparison with said output of said first temperature detecting means.

5. The developing apparatus according to claim 4, wherein said second temperature detecting means is connected in series to said first temperature detecting means, and
   said detecting circuit means further includes comparing means for comparing an electrical potential of a connecting point between said first temperature detecting means and said second temperature detecting means with a reference electrical potential.

6. The developing apparatus according to claim 3, further comprising a second temperature detecting means provided in a toner-always-existing position of said developing unit.

7. The developing apparatus according to claim 6, wherein said first temperature detecting means exhibits a temperature detecting characteristic similar to a temperature detecting characteristic of said second temperature detecting means.

8. The developing apparatus according to claim 3, further comprising a heating body provided in said developing unit.

9. The developing apparatus according to claim 2, wherein said detecting circuit means includes a second temperature detecting means for making a comparison with said output of said first temperature detecting means.

10. The developing apparatus according to claim 9, wherein said second temperature detecting means is connected in series to said first temperature detecting means, and
    said detecting circuit means further includes comparing means for comparing an electrical potential of a connecting point between said first temperature detecting means and said second temperature detecting means with a reference electrical potential.

11. The developing apparatus according to claim 2, further comprising a second temperature detecting means provided in a toner-always-existing position of said developing unit.

12. The developing apparatus according to claim 11, wherein said first temperature detecting means exhibits a temperature detecting characteristic similar to a temperature detecting characteristic of said second temperature detecting means.

13. The developing apparatus according to claim 2, further comprising a heating body provided in said developing unit.

14. The developing apparatus according to claim 13, further comprising means for causing said heating body to periodically emit heat.

15. The developing apparatus according to claim 1, wherein said detecting circuit includes a second temperature detecting means for making a comparison with said output of said temperature detecting means.

16. The developing apparatus according to claim 4, wherein said first temperature detecting means exhibits temperature detecting characteristic similar to a temperature detecting characteristic of said second temperature detecting means.

17. The developing apparatus according to claim 15, wherein said second temperature detecting means is connected in series to said first temperature detecting means, and said detecting circuit means further includes comparing means for comparing an electrical potential of a connecting point between said first temperature detecting means and said second temperature detecting means with a reference electrical potential.

18. The developing apparatus according to claim 1, further comprising a second temperature detecting means provided in a toner-always-existing position of said developing unit.

19. The developing apparatus according to claim 18, wherein said first temperature detecting means exhibits a temperature detecting characteristic similar to a temperature detecting characteristic of said second temperature detecting means.

20. The developing apparatus according to claim 1, further comprising a heating body provided in said developing unit.

21. The developing apparatus according to claim 20, further comprising means for causing said heating body to periodically emit heat.

* * * * *